(12) United States Patent
Selch

(10) Patent No.: US 7,695,230 B2
(45) Date of Patent: Apr. 13, 2010

(54) APPARATUS FOR LOADING AND UNLOADING FREEZE-DRYING CHAMBERS

(75) Inventor: Johannes Selch, Pfungstadt-Eschollbrücken (DE)

(73) Assignee: GEA Lyophil GmbH (DE)

( * ) Notice: Subject to any disclaimer, the term of this patent is extended or adjusted under 35 U.S.C. 154(b) by 1002 days.

(21) Appl. No.: 10/546,461

(22) PCT Filed: Feb. 5, 2004

(86) PCT No.: PCT/EP2004/001058

§ 371 (c)(1),
(2), (4) Date: Apr. 18, 2006

(87) PCT Pub. No.: WO2004/074143

PCT Pub. Date: Sep. 2, 2004

(65) Prior Publication Data

US 2006/0263179 A1  Nov. 23, 2006

(30) Foreign Application Priority Data

Feb. 22, 2003 (DE) .............................. 103 07 571

(51) Int. Cl.
*B65G 47/66* (2006.01)
(52) U.S. Cl. ...................... 414/180; 34/236
(58) Field of Classification Search ................ 414/214, 414/217; 34/92, 248, 284; 198/600
See application file for complete search history.

(56) References Cited

U.S. PATENT DOCUMENTS

| 2,457,240 A | * | 12/1948 | Jorgensen | ............. | 89/36.14 |
| 2,793,736 A | * | 5/1957 | Thomson | ............. | 198/782 |
| 3,516,469 A | * | 6/1970 | McDonald | ............. | 160/26 |
| 3,944,037 A | * | 3/1976 | Stease | ............. | 193/35 TE |
| 4,628,646 A | * | 12/1986 | Eyerle | ............. | 52/71 |
| 5,106,259 A | * | 4/1992 | Anderson et al. | ............. | 414/807 |
| 5,129,162 A | * | 7/1992 | Hemmersbach et al. | ............. | 34/284 |
| 5,649,800 A | * | 7/1997 | Hemmersbach et al. | ............. | 414/180 |
| 7,421,801 B2 | * | 9/2008 | Kluetsch et al. | ............. | 34/284 |

* cited by examiner

*Primary Examiner*—Charles A Fox
(74) *Attorney, Agent, or Firm*—Kusner & Jaffe

(57) ABSTRACT

An apparatus having a supporting surface (3) for containers (4) and a device for loading and unloading the containers (4) onto the supporting surface (3). The device has a component (11) for unloading the containers from the supporting surface and a drive unit (12) for facilitating movement of the component (11) relative to a supporting surface (3).

21 Claims, 9 Drawing Sheets

APPARATUS FOR LOADING AND UNLOADING FREEZE-DRYING CHAMBERS

FIELD OF THE INVENTION

The invention relates to an apparatus having at least one supporting surface for containers, said apparatus having a device for loading and/or unloading containers on the supporting surface. The device includes a part that can be slid onto the supporting surface and withdrawn therefrom and a drive mechanism for the device.

BACKGROUND OF THE INVENTION

An example for an apparatus of the kind in question here is a freeze-drying apparatus as described in EP-B1-391 208 (U.S. Pat. No. 5,129,162). A plurality of containers containing a product that is to be freeze-dried must be loaded onto supporting surfaces of the freeze-drying apparatus. Unloading is required after performing a freeze-drying process. Due to the extremely large number of containers that are loaded and unloaded during a batch, these processes are no longer performed manually. Typically, the containers are transported to and from the freeze-drying apparatus on conveyer belts. The containers are transferred from the conveyor belt to the supporting surfaces located in the chamber and back therefrom, after performing the freeze-drying process, by means of a sliding element.

The loading of the supporting surfaces of freeze-drying chambers or similar equipment must take place under extremely clean conditions since the containers or bottles containing the product to be freeze-dried are initially opened. Usually, a plug having a recess for the removal of the water vapor, lies on the opening of each of the containers. After performing the freeze-drying process, the containers are closed in the freeze-drying chamber by moving the supporting surfaces together and forcing the plug into the container. Even though the containers have already been closed, the unloading of the containers from the supporting surfaces, and the transfer of the containers to a capping device, occurs under clean room conditions. In this respect, freeze-drying facilities are equipped with insulators—if they are not located in clean rooms. An insulator, that is preferably formed by transparent wall sections, encloses those areas of the freeze-drying apparatus in which clean room conditions are supposed to be maintained. This also includes the container feed and removal means. Compared to the typical clean rooms, an insulator has the advantage that the required clean room volume is significantly smaller.

In freeze-drying apparatuses and installations of similar type, the drive systems for the moving parts are a problem. A spindle drive is used in the aforementioned freeze-drying apparatus. The use of toothed racks is also known. Drives of this type require a lot of space. Moreover, such structures include relatively narrow indentations or recesses, that require long sterilization periods. Since lubricants can also lead to contamination, drives of this type must be operated "dry". The consequence is increased abrasion, which likewise causes contamination.

SUMMARY OF THE INVENTION

The object of the present invention is to design a drive system for apparatuses of the type heretofore described, wherein the described above-identified disadvantages are largely eliminated.

According to the invention, this object is achieved by the characterizing features of the patent claims.

A particular advantage of the present invention is a drive system that can be installed in one or two detachable housings in a space-saving manner. The drive system includes an articulation system, that is comprised of rigid elements that are connected with each other in an articulated manner that allows transmission of both pressure and tractive forces. Unloading lengths of several meters can be bridged, i.e., spanned. The articulation system is designed in terms of the articulation design and the material selection such that abrasion practically no longer occurs, i.e. no abrasion particles can reach the vicinity of the product, since in the retracted state articulation movements no longer take place.

The invention further provides a modular design. A drive wheel and winding system for the link chain can be accommodated in separate housings that are detachable from the apparatus, and hence be cleaned and/or sterilized independently from the apparatus. The interior spaces of the housing(s) can be formed as part of the insulator. The foregoing design requires only an outward rotational movement of the drive wheel, thus reducing the risk of contaminated air penetrating into the insulator to a minimum.

The invention can be used wherever supporting surfaces with containers, be it bottles, basins or the like, need to be loaded and/or unloaded. Their use is especially beneficial in apparatuses with insulators. Freeze-drying devices, sterilizing devices, rinsing systems or storage units with loading or unloading tables, formatting tables, batch breakdown tables, conveyer belt systems and working surfaces are examples of such apparatuses. If the apparatus having the supporting surfaces is loaded and unloaded from a side, the part that is moved by the drive system by means of the articulation system can be used for both the loading and unloading operation. If a supporting surface is loaded and unloaded from different sides, the carriage preferably assists in the unloading step since it can span relatively large unloading lengths.

Additional advantages and details of the invention shall be explained with reference to FIGS. 1 through 10.

BRIEF DESCRIPTION OF THE DRAWINGS

A freeze-drying apparatus is illustrated schematically as an exemplary embodiment, wherein.

DETAILED DESCRIPTION OF PREFERRED EMBODIMENT

Figure 1:
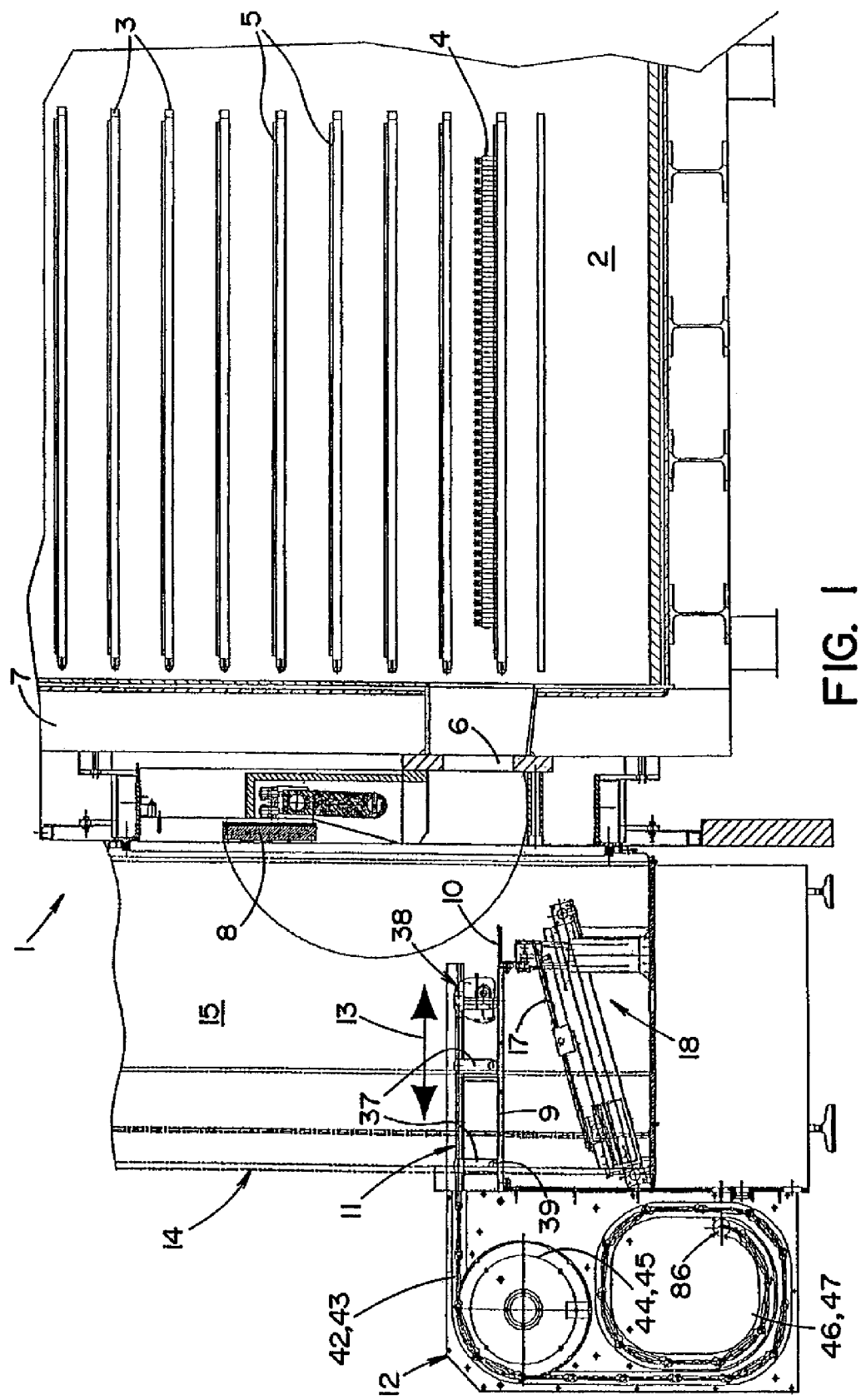
FIG. 1 is a sectional view taken through a freeze-drying apparatus, illustrating a preferred embodiment of the invention.

A freeze-drying apparatus illustrated in the figures is designated by reference numeral 1. Freeze-drying apparatus 1 includes a chamber 2, that is only partially illustrated, and that contains supporting surfaces 3. A container 4 is illustrated on one of the supporting surfaces 3 by way of example. The containers 4 are guided by lateral bars 5.

With the help of a cylinder-piston system, that is not shown in detail, the supporting surfaces 3 can be adjusted in terms of their height. This height adjustment allows for one the individual supporting surfaces 3 to be adjusted to a certain loading and/or unloading height relative to a loading opening 6. In addition, following a freeze-drying process the supporting surfaces 3 can be pushed together with the help of the cylinder-piston device to force plugs in the container into the same to close the containers 4.

On the front side of freeze-drying apparatus 1, the chamber 2 includes a vacuum sealable door 7, that is equipped with the loading opening 6. Opening 6 can be closed by means of a movable flap 8. At the height of the loading opening 6, loading and unloading devices, are arranged on the front side of drying apparatus 1. The loading and unloading devices include a working plane 9, a conveyer belt system 10 that adjoins the plane 9 and assists in the feeding and removal of the containers 4 and sliding parts. FIG. 1 shows a carriage 11 having a drive system, that has been designated by reference numeral 12. The carriage 11 assists in the unloading of the supporting surfaces 3, as shall be further described below. The double arrow 13 indicates the directions of motion of carriage 11. In its retracted state—as illustrated in FIG. 1—carriage 11 is supported by the working plane 9.

An insulator 14 is shown in FIG. 1. Insulator 14 defines insulator room 15 that surrounds the area in front of the loading opening 6. The freeze-drying chamber 2 forms a lateral wall of the insulator 14. The loading opening 6 opens into the insulator room 15. The insulator room 15 typically extends along the conveyor belt system 10. Specifically, the insulator extends on the feed side to a filling device (not shown) that fills the containers 4 and on the removal side to a capping device (not shown). The walls of the insulator 14 appropriately consist of transparent plastic that can be sterilized, e.g. polyethylene.

During the loading and unloading phases, the space between the conveyor belt 10 and the respective supporting surface 3 must be bridged through the loading opening 6. This occurs by means of a sliding plate 17 that can also be adjusted in terms of its angle. A drive system 18, that is only illustrated schematically in the drawing, is supported beneath the loading plane. As illustrated in FIG. 1, sliding plate 17 is located beneath the loading plane when in its resting, i.e., retracted position. Like the supporting surfaces 3, sliding plate 17 includes lateral bars, that prevent the containers 4 from falling off the side of the sliding plate 17.

Figure 2:
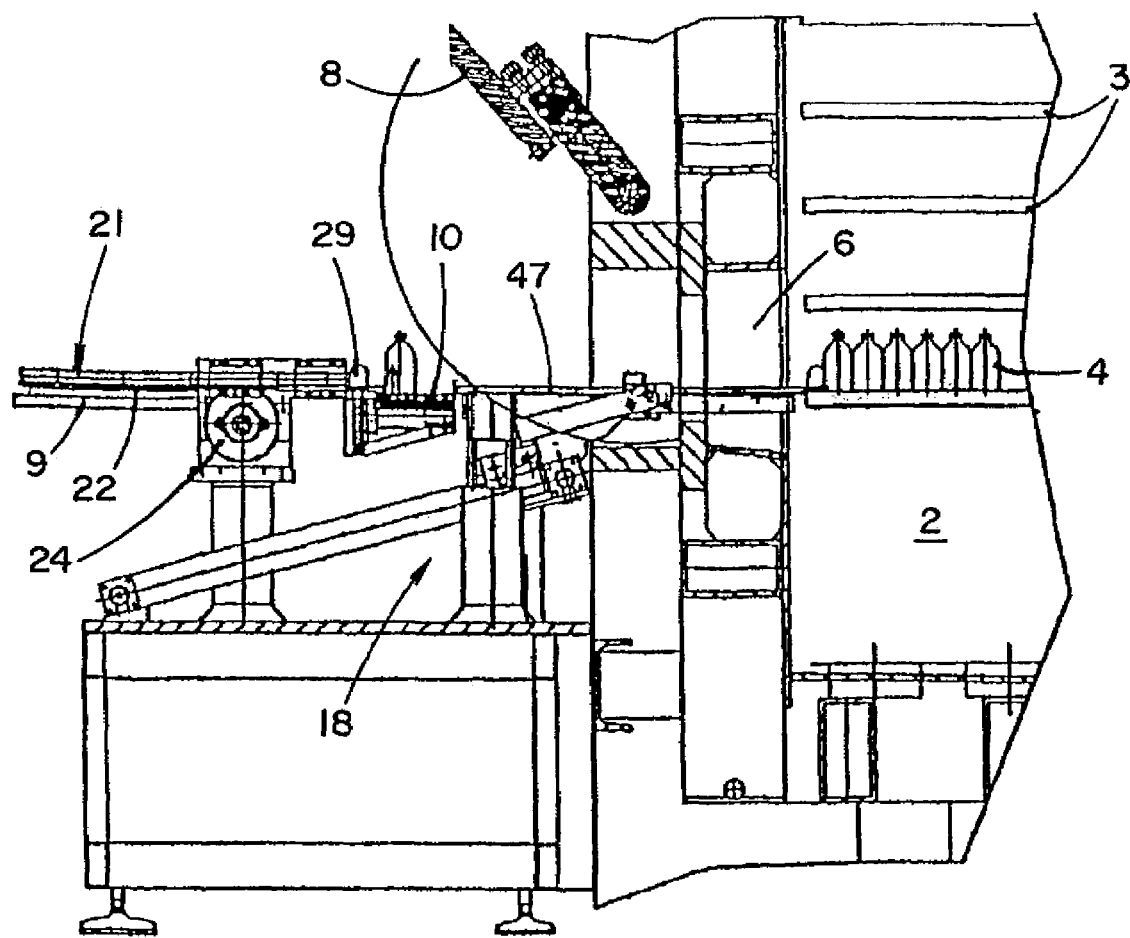
FIG. 2 is a partial section through a freeze-drying apparatus having a supporting surface, which is in the loading phase.
Figure 3:
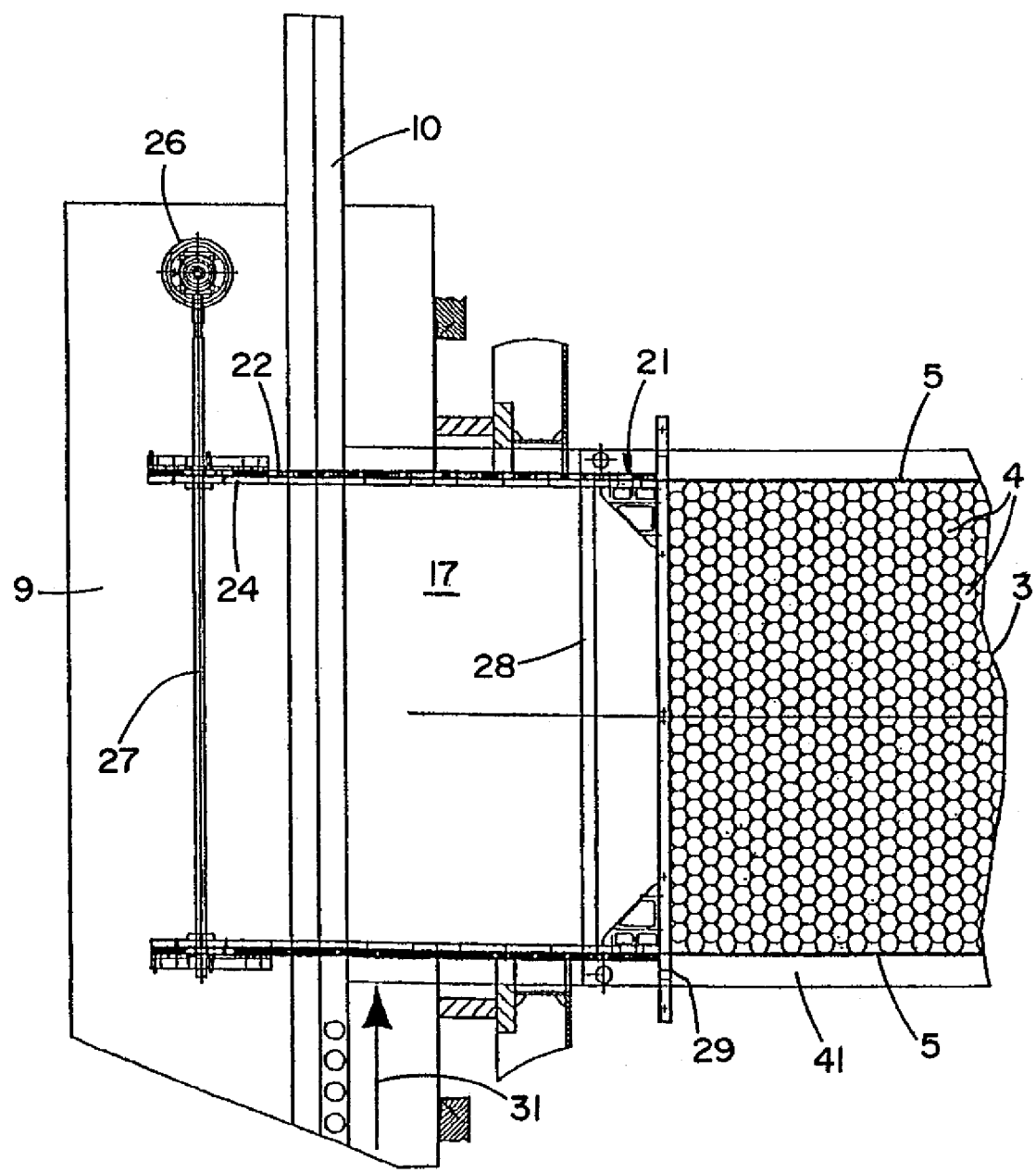
FIG. 3 is a top view of the loading plane from FIG. 2.

Referring now to FIGS. 2 and 3, further details of freeze-drying apparatus 1, as well as the loading process of a supporting surface 3, shall be described. The carriage 11 is not used for the loading step. Loading occurs with the help of a slide 21. In FIGS. 2, 3 the carriage 11 serving the unloading process has not been illustrated for clarity reasons. The carriage 11 and slide 21 are dimensioned such that they do not impair each other's movements.

The slide 21 is equipped laterally with toothed racks 22, which engage gear wheels 24. The gear wheels 24 are located beneath the working plane 9 and extend through openings to engage the toothed racks 22. Beneath the working plane 9, a drive 26 and a shaft 27 (FIG. 3) are located. Gear wheels 24 are driven synchronously by drive 26 and shaft 27. The slide 21 is designed as a stable frame with a transverse rod 28 and a front strip 29.

This power transmission system for moving slide 21 can be replaced with toothed belts or spindle units that are coupled to each other.

Moreover the shaft 27 can be implemented mechanically and electrically (in the case of an electrical version by means of two drives).

The containers 4 transported by the conveyor belt 10 are slid, i.e., pushed, onto a supporting surface 3 by means of the slide 21 in order to load a supporting surface 3. This occurs after opening the loading opening 6, adjusting an empty supporting surface 3 to the loading height and moving the plate 17 in its operating position. Thereafter a latch (not represented) is closed, which is located on the side of the supporting surface 3 facing away in the conveying direction (arrow 31 in FIG. 3). Closing this latch causes the surface of the conveyor belt 10 in front of the supporting surface 3 to be filled with containers 4. Once it is full, the conveyor belt 10 is stopped. The slide 21 slides i.e., pushes, the containers 4 from the conveyor belt 10, over plate 17 onto the supporting surface 3. The bars 5 both on the plate 17 and on the supporting surface 3 prevent the containers 4 from falling off the side.

All supporting surfaces 3 are loaded successively in the afore-described manner. Once the loading process has been completed, the plate 17 is lowered and retracted, the loading opening 6 is closed by flap 8. The product located in the containers 4 is then freeze-dried, as is conventionally known.

Figure 4:
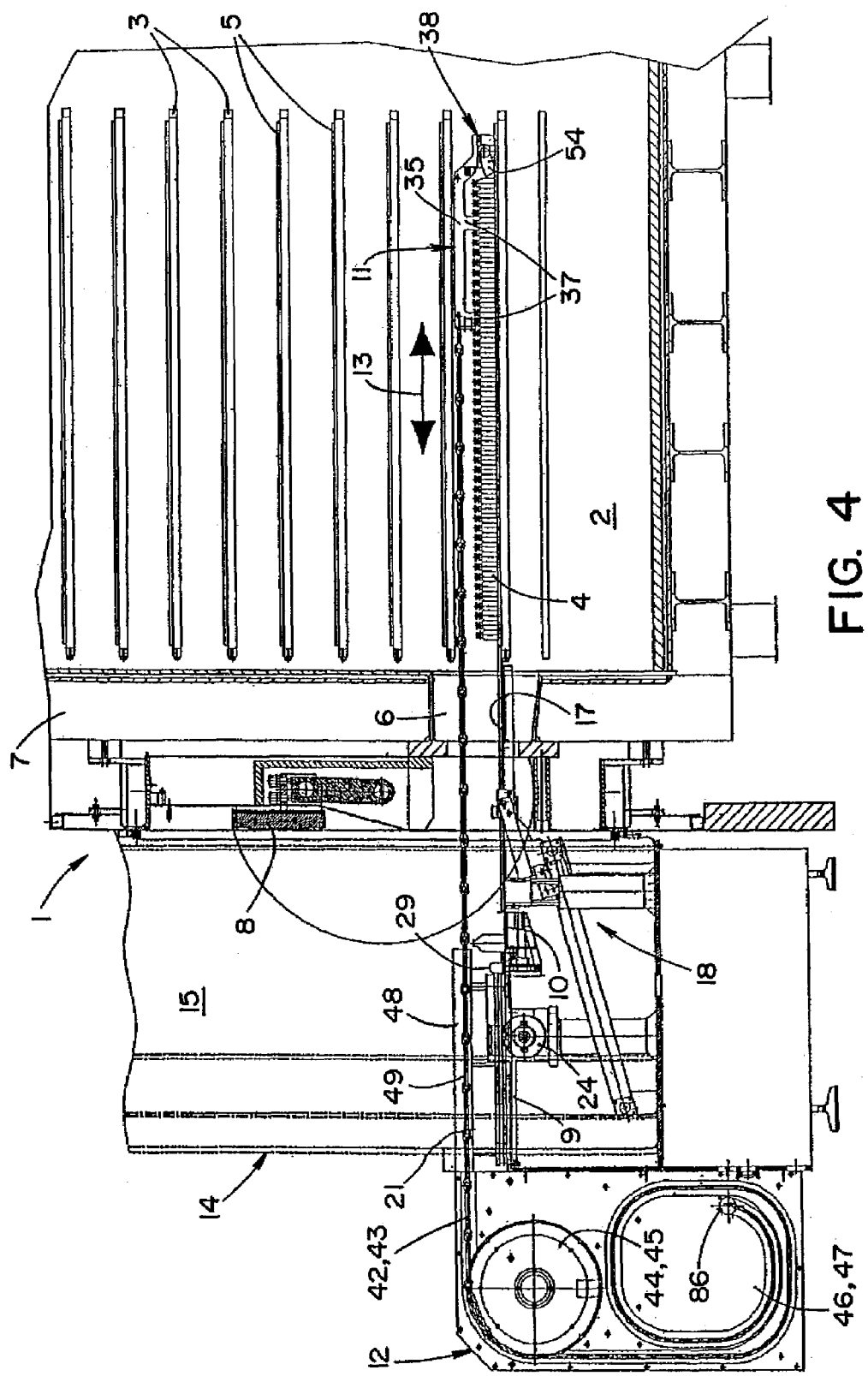
FIG. 4 is a sectional view of a freeze-drying apparatus having a supporting surface, which is in the unloading phase.
Figure 5:
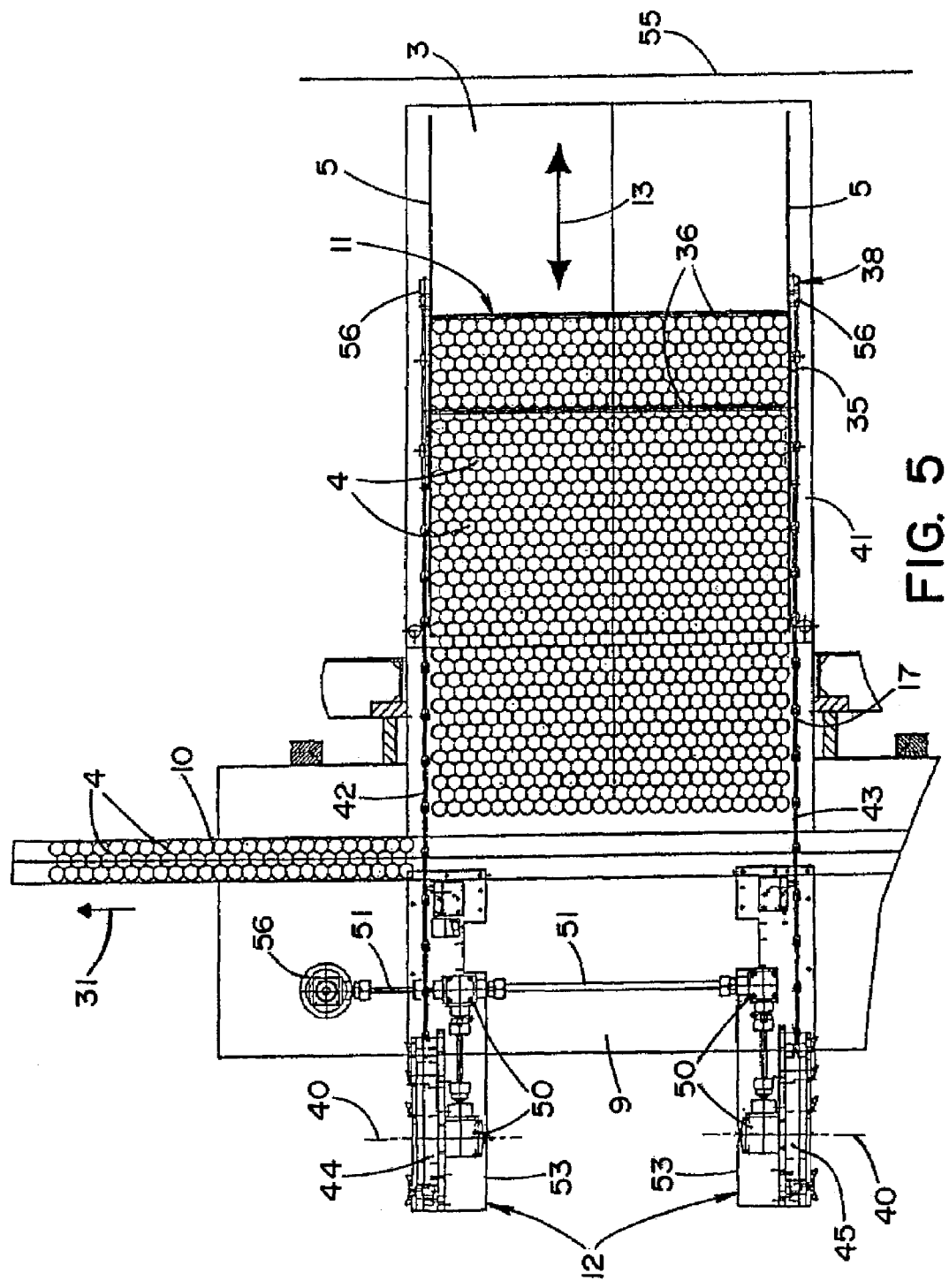
FIG. 5 is a top view of the unloading plane from FIG. 4, FIGS. 6 and 6a are two constructions for partial views of an unloading carriage with different variations of visor devices.

As already mentioned, the carriage 11, best illustrated in FIG. 1, assists in the unloading of the supporting surface 3 after the freeze-drying step has been performed and after the containers 4 have been closed, i.e., after the plugs have closed the openings to the containers 4. Referring now to FIGS. 4 and 5, the unloading process will now be described.

FIG. 1 shows the carriage 11 in its retracted position. FIGS. 4 and 5 show carriage 11 in positions in chamber 2. Its directions of motion are designated by the double arrow 13. The carriage 11 is designed as a stable frame with transverse and longitudinal bars 35, 36 as well as with supports 37. At the front, carriage 11 includes a panel device 38 (see also FIG. 1). The lower ends of supports 37 are equipped with rollers or wheels 39, preferably made of plastic, that support the carriage 11 on working plane 9, plate 17, supporting surfaces 3. The height of the transverse and longitudinal bars 35, 36 of the carriage 11 has been selected such that 1) slide 21 that is located in the area of the working plane 9 and 2) containers 4 can fit thereunder as carriage 11 moves. The distance between the support rollers or wheels 39 has been selected such that the carriage 11 is supported laterally on the supporting surfaces 3 during its motions within the chamber 2, specifically on the edges 41 located outside lateral bars 5. The plate 17 comprises also similar outer edges.

The drive system 12 facilitates movement of the carriage 11. Drive system 12 is comprised of two articulation systems 42, 43, the free ends of which are attached laterally to the carriage 11, e.g., on the longitudinal bars 35. Each articulation system 42, 43 is allocated a drive wheel 44, 45, respectively, as well as a winding system 46, 47 arranged beneath. Drive system 12, that is described in more detail below, allows tractive and pressure forces to be transmitted to the carriage 11, specifically across the relatively long distance required for the unloading process, without the risk of creating abrasion particles in the vicinity of the product.

The articulation systems 42, 43 comprise rigid parts or elements that are connected to each other in an articulated manner. Like the carriage 11, the rigid parts of articulation systems 42, 43 are comprised of VA steel with rounded surfaces in order to achieve good sterilization results.

FIGS. 4 and 5 show the carriage 11 in positions within chamber 2. Slide 21, that is used in the loading process, is in its retracted state (FIG. 4). Guide sections 48, each having an elongated slot or groove 49 formed thereon, are disposed above, and to the sides of, working plane 9. Guide sections 48 are disposed to guide articulation systems 42, 43 and carriage 11 between an extended position and a retracted position. The drive wheels 44, 45 serve to drive the articulation systems 42, 43. The axes of rotation 40 of drive wheels 44, 45 are aligned substantially perpendicular to the direction of motion (double arrow 13) of the carriage 11. The drive wheels 44, 45, and respective winding systems 46, 47, are located in one plane. The synchronous rotational movement of the drive wheels 44, 45 is created by drive means comprising gear assemblies 50 and shaft sections 51, which are coupled to a drive motor 52 (FIG. 5). The synchronous rotational movement can also be generated by means of an electrical connection (using two drives).

Both the described drive means and the respective drive wheels 44, 45 with respective winding systems 46, 47 are located beneath insulator 14. Corresponding wall sections have been designated by reference numeral 53.

After performing the freeze-drying process, the chamber 2 is unloaded by ventilating the chamber 2, opening the loading opening 6 and moving the plate 17 to its operating position. Each of the supporting surfaces 3 is moved successively to the loading and/or unloading height (at opening 6) and unloaded as follows. The carriage 11 is moved into the chamber 2, until the panel device 38 on carriage 11 (see also FIGS. 6 and 6a) is located behind the containers 4 located furthest from the loading opening 6. Panel device 38 comprises an elongated plate or panel 54, that is in a raised position when the carriage 11 travels into the chamber 2, such that plate or panel 54 does not come in contact with containers 4. The contact of the panel device 38 with the back wall 55 of chamber 2 triggers a lowering of the panel 54. Thereafter the carriage 11 is retracted. Carriage 11 is retracted either in stages about the width of the conveyor belt 10, or so slowly that the containers 4 can be transported onto conveyor belt 10 without problems while the conveyor belt 10 is running. During its motions, carriage 11 is constantly guided laterally, specifically on the supporting surfaces 3 and plate 17 by means of the lateral bars 5, and on the working plane 9 by means of the guide sections 48.

Figure 6:
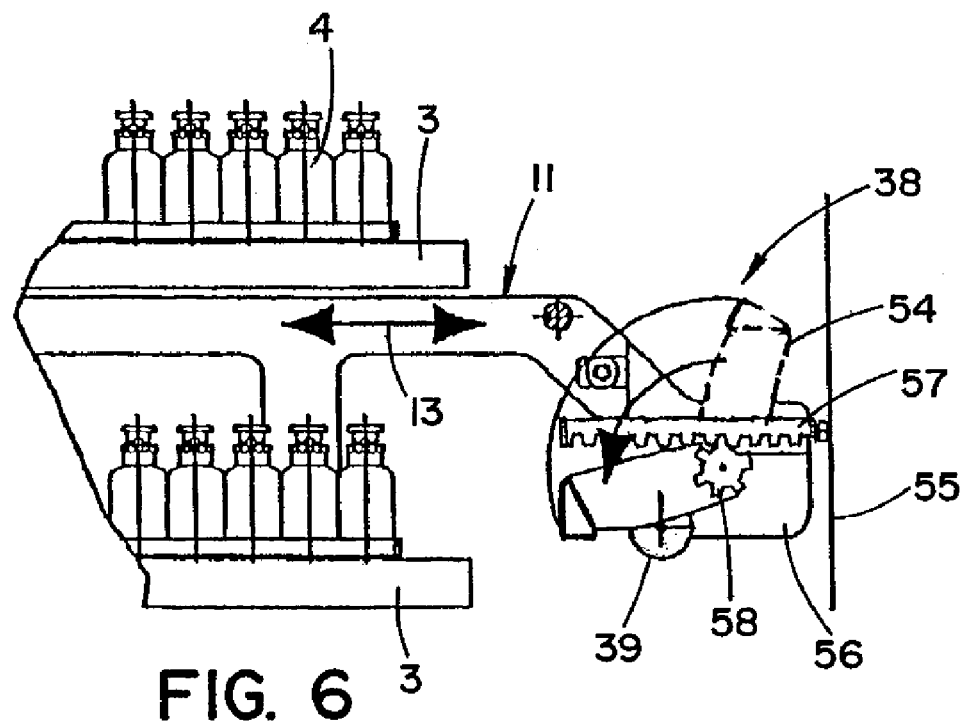
Figure 6A:
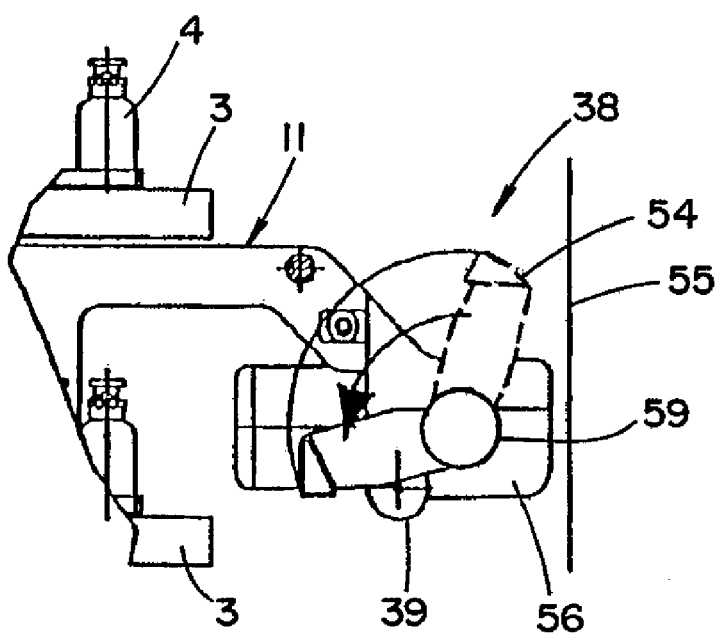

FIGS. 6 and 6a show two embodiments of panel device 38, in enlarged views. The panel device 38 includes a lateral carrier disk 56, in which the panel 54 is rotatably mounted. Panel 54 is illustrated both in its raised (dotted lines) and lowered positions. The actuation of the panel 54 is designed such that it is not necessary to trail cable connections into chamber 2 and across the containers 4. FIG. 6 shows a mechanical solution. A toothed rack 57 displaceable in the direction of the double arrow 13, engages a pinion gear wheel 58. When the carriage 11 travels into chamber 2, i.e. with the panel 54 in a raised position (dotted lines), the toothed rack 57 protrudes from the front of the carrier disk 56. Due to its contact with the chamber back wall 55, the toothed rack 57 is moved back relative to the carrier disk 56 and causes the panel 54 to be lowered via the gear wheel 58. Thereafter the back movement of the carriage 11, i.e., out of chamber 2 returns panel 54 to the raised position, for example by engagement with a position indicator on the drive system 12, during the already described unloading process.

An electrical solution for the actuation of the panel 54 is to be described with reference to FIG. 6a, which also has the advantage that the trailing cable connections are not required. In the embodiment shown in FIG. 6a, the carrier disk 56 carries a servo motor 59, which is coupled to the panel 54. Its actuation occurs for example by means of the afore-mentioned position indicator on the drive system 12. At least one of the articulation systems 42, 43, as do the longitudinal bars 35 of the carriage 11, assist in the transmission of signal and actuating. Prerequisites for this solution are that the articulation systems, as well as the longitudinal bars 35 of the carriage 11, are electrically conductive, and that electrical insulation exists with respect to other parts that they come in contact with. In order to establish the electrical contact between an articulation system 42, 43 and a power source or a control device, a contact (not shown) is provided in the area of the working plane 9.

Figure 7:
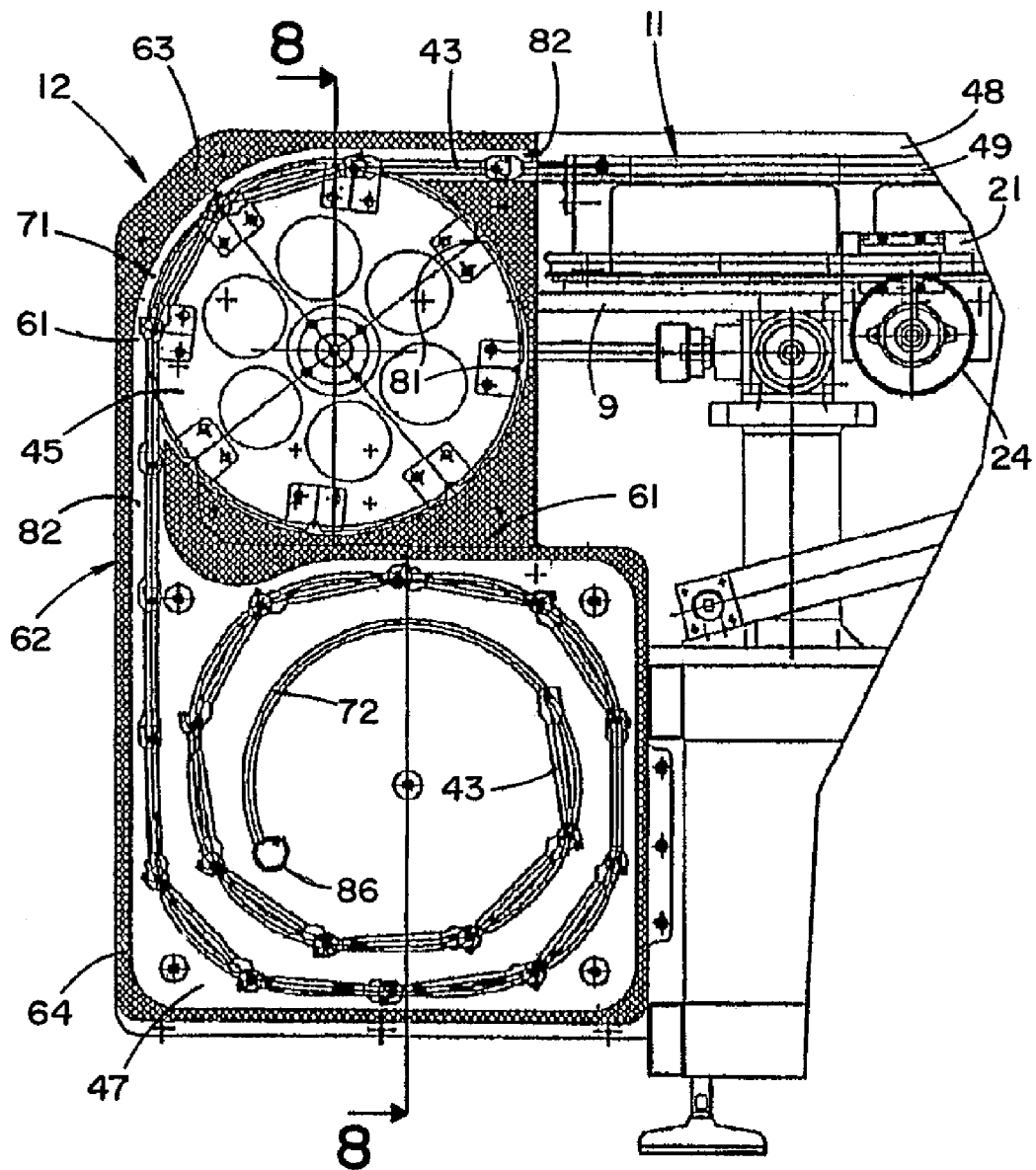
FIGS. 7 and 8 are sections through one of the drive apparatuses for the unloading carriage, as well as FIGS. 9 and 10 are views of sections of the articulation systems.
Figure 8:
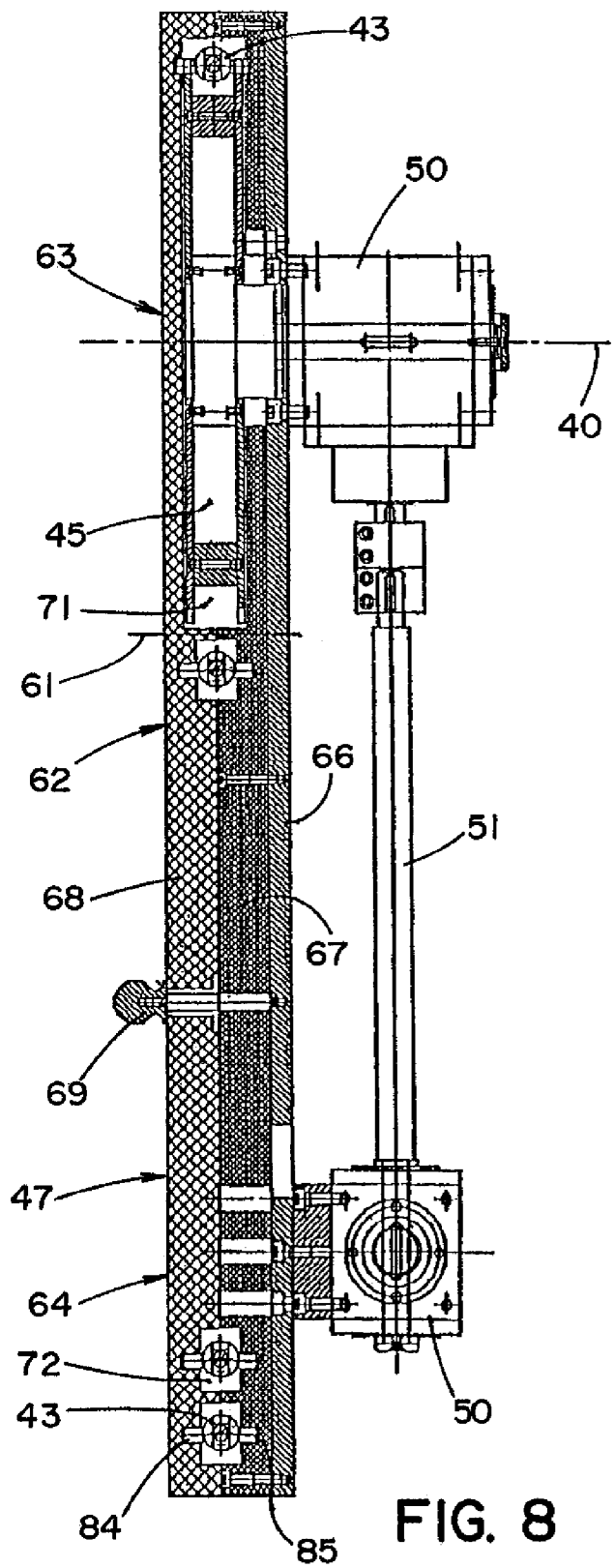

Referring now to FIGS. 7 and 8, details are best seen of a drive wheel 45 for the actuation system 43 and its corresponding winding system 47. FIG. 8 is a cross-sectional view taken along lines VIII-VIII of FIG. 7. FIG. 8 shows parts of the drive means. The drive wheel 45 and winding system 47 are arranged in a housing 62 that can be separated along lines 61 so that they are accommodated in separate cassettes 63, 64. The housing 62 comprises a base disk 66, on which two additional disks 67 and 68 are detachably arranged (screw connections 69). The sides of the disk 67, 68 that face each other include recesses, that in the area of the cassette 63 form a hollow space 71 to receive the drive wheel 45, and in the area of the cassette 64 a spiral-shaped hollow space 72 for accommodating the articulation system 43. It is appropriate to use a plastic that can be sterilized for the housing 62.

Figure 9:
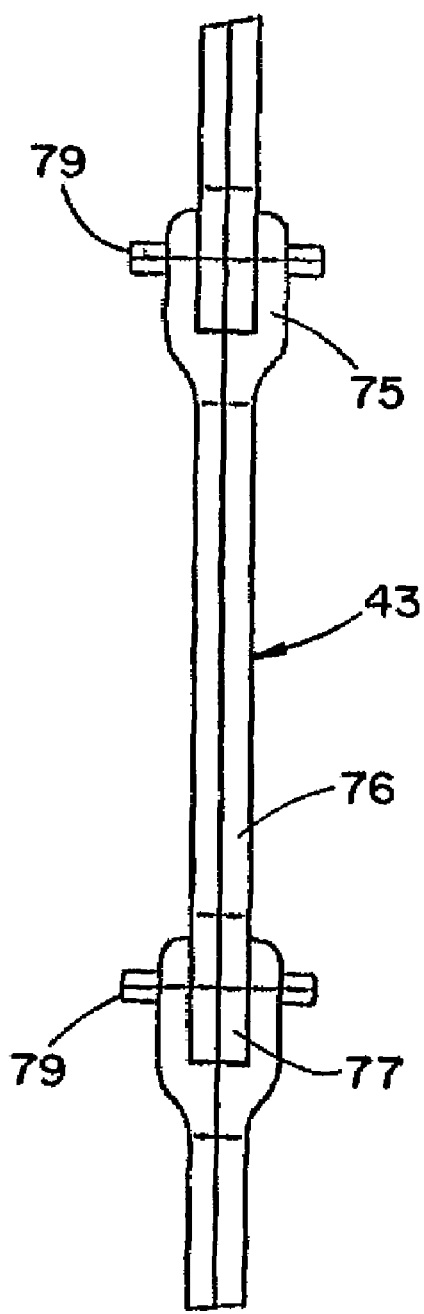
Figure 10:
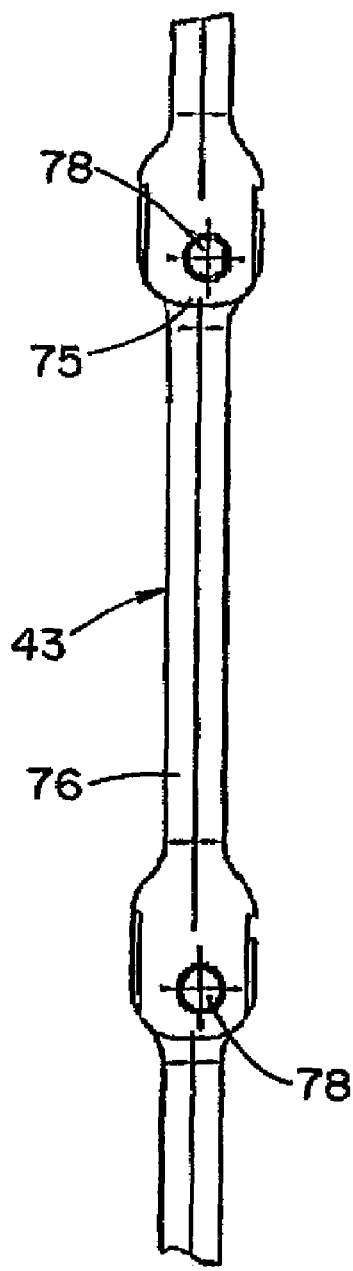

As illustrated in FIGS. 9, 10, the articulation systems 43, 44 are comprised of rod sections 76, which are connected to each other in an articulated manner and whose one end 75 has a U-shaped section and other end 77 has a section with flat lateral surfaces. A pin 78 extends through joined end pieces 75, 77 to form an articulated joint. Ends 79 of the pins 78 project laterally from the articulation systems 42, 43, and are used to guide the articulation systems 42, 43.

The entering/exiting opening for the articulation system 43 from the cassette 63 has been designated by reference numeral 82 (FIG. 7). In order to be able to apply tractive and pressure forces to the articulation system 43, the drive wheel 45 has peripherally-spaced recesses 81 at distances to receive the ends 79 of pins 78. The articulation system 43 entering or exiting the cassette 64 through opening 82 engages in the recesses 81 with ends 79 of pins 78 extending across the width of the drive wheel 45, such that a friction-locking connection exists.

In the area of the cassette 64, a spiral-shaped hollow space 72 includes lateral grooves 84, 85. The ends 79 of pins 78 of articulation system 43 are received in these grooves so that the articulation system 43 can be accommodated in the cassette 64 in a space-saving manner.

In the area of the inner end of the spiral-shaped hollow space 72, an opening 86 is provided. A device, (not shown) that is capable of supplying the insulator room 15 with sterile gases, e.g. sterile air, is connected to opening 86. At least a portion of these gases that enter through the opening 86, also enter the hollow spaces 72 and 71 and keep the same sterile in the cassettes 64, 63, especially during operation. Outside the operating hours of freeze-drying apparatus 1, the interior space of the insulator 14 is decontaminated. During these processes sterilization gases, e.g. hydrogen peroxide, are fed in insulator 14. This occurs likewise through the openings 86 so that the hollow spaces 71 and 72 are also sterilized.

Having described the invention, the following is claimed:

1. In an apparatus having a supporting surface (3) for containers (4) and a device for loading and unloading said containers (4) onto said supporting surface (3), said device having a component (11) for unloading said containers from said supporting surface and a drive unit (12) for facilitating movement of said component (11) relative to a supporting surface (3), the improvement comprising:

a working plane (9) and a conveyor belt system (10) for loading and unloading said apparatus, said working plane (9) and said conveyor belt system (10) being disposed to one side of said supporting surface (3);

said drive unit (12) having drive wheels (44, 45), an articulation system (42, 43), and a winding system (46, 47) for winding said articulation system (42, 43);

said drive unit (12) being operable to convey said articulation system (42, 43) along a predetermined path;

said articulation system (42, 43) being attached to said component (11) for moving said component relative to said supporting surface (3);

said drive wheels (44, 45) being rotatable about an axis (40) wherein said axis (40) is disposed perpendicularly to said linear direction of motion of said component; and said winding system (46, 47) being in alignment with said drive wheels (44, 45) wherein said conveyor belt system (10) is located between said working plane (9) and said supporting surface (3);

said conveyor belt system (10) is adjacent to said working plane (9) and separated by a space from said supporting surface (3); and an adjustable plate (17) is operable to bridge said space between said conveyor belt system (10) and said supporting surface (3); wherein said supporting surface (3) includes a first pair of lateral bars for guiding containers (4), and said supporting surface (3) includes first edges for supporting said component (11), said first edges being disposed outside of said first pair of lateral bars; and said plate (17) includes a second pair of lateral bars for guiding containers (4), said plate (17) further comprising second edges for supporting said component (11), said second edges being disposed outside of said second pair of lateral bars.

2. An apparatus according to claim 1 wherein said component is a carriage (11) including a longitudinal bar;

said carriage (11) being supported by means of supports (37) and rollers (39).

3. An apparatus according to claim 2, wherein said longitudinal bar is connected to said articulation system (42, 43).

4. An apparatus according to claim 3, wherein said carriage (11) is equipped with a panel device (38) that carries a movable panel (54) having a first position and a second position.

5. An apparatus according to claim 4, characterized in that said panel (54) can be actuated mechanically.

6. An apparatus according to claim 5, characterized in that said panel device (38) is equipped with a toothed rack (57) aligned in said linear direction, which engages a gear wheel (58) connected to said panel (54).

7. An apparatus according to claim 6, characterized in that said panel device (38) can be actuated electrically.

8. An apparatus according to claim 7, wherein said panel device (38) is equipped with a servo motor (59) for positioning said panel (54) in one of said first and said second positions, and said articulation system (42, 43) is operable to conduct one of a transmitting signal and an actuating current.

9. An apparatus according to claim 8, wherein said articulation system (42, 43) includes a plurality of rod sections (76), each of said rod sections (76) having a first end (75) and a second end (77) wherein said first end (75) of said rod sections (76) being connected to said second end (77) of adjacent rod sections (76) in an articulated manner.

10. An apparatus according to claim 9, wherein said articulation system (42, 43) includes steel pins (78) having ends (79) that project laterally from said articulation system (42, 43).

11. An apparatus according to claim 10, wherein said drive wheels (44, 45) include peripherally-spaced recesses (81) dimensioned to receive said ends (79).

12. An apparatus according to claim 11, wherein said winding system (46, 47) includes a housing (62) having a spiral-shaped hollow space (72) defined therein, said housing (62) having lateral grooves (84, 85) for guiding said ends (79) of said articulation system (42, 43).

13. An apparatus according to claim 1, further comprising a housing (62) having hollow spaces (71, 72) for accommodating said drive wheels (44, 45), said winding system (46, 47) and said articulation system (42, 43).

14. An apparatus according to claim 1, further comprising a housing (62) including a first cassette (63) having a first hollow space (71) defined therein and a second cassette (64) having a spiral shaped second hollow space (72) defined therein, wherein both first cassette (63) and second cassette (64) are detachably connected to said apparatus.

15. An apparatus according to claim 1, further comprising an insulator (14).

16. An apparatus according to claim 15, further comprising a housing (62) having a first hollow space (71) and a spiral shaped second hollow space (72) defined therein, wherein said insulator (14) defines an insulator room (15); and said first hollow space (71) and said spiral shaped second hollow space (72) being fluidly connected to said insulator room (15).

17. An apparatus according to claim 16, wherein said housing (62) has an opening (86) defined therein for fluidly connecting said second hollow space (72) to a source for sterile gases.

18. An apparatus according to claim 1, further comprising a slide (21) for loading containers onto said supporting surface (3).

19. An apparatus according to claim 18, wherein said supporting surface (3) includes a loading side and said slide (21) and said component for unloading are both disposed in proximity to said loading side such that both slide (21) and said component for unloading can move freely.

20. An apparatus according to claim 1, wherein said apparatus is a device for freeze-drying that includes a chamber (2) having a plurality of supporting surfaces (3) vertically arranged therein.

21. An apparatus according to claim 20, wherein said chamber (2) has an opening (6) dimensioned to allow containers to pass therethrough; and a slide (21) and a component for unloading disposed such that slide (21) can facilitate loading of said containers onto said supporting surface (3) through said opening (6) and said component for unloading can facilitate unloading of said containers from supporting surfaces (3) through said opening (6).

* * * * *